United States Patent [19]
Dirckx et al.

[11] Patent Number: 5,874,484
[45] Date of Patent: Feb. 23, 1999

[54] USE OF POLYOL MIXTURES IN RIGID AND SEMI-RIGID POLYURETHANE FOAMS

[75] Inventors: Veerle Maria Rafaela Dirckx; Eric-Jack Gerard; Hans Ferdinand Vermeire, all of Louvain-la-Neuve, Belgium

[73] Assignee: Shell Oil Company, Houston, Tex.

[21] Appl. No.: 956,891

[22] Filed: Oct. 23, 1997

[30] Foreign Application Priority Data

Jan. 30, 1997 [EP] European Pat. Off. .............. 97300591

[51] Int. Cl.$^6$ .................................................... C08G 18/00
[52] U.S. Cl. .......................... 521/155; 521/157; 521/170; 521/175; 521/176; 528/66; 528/75; 528/80; 528/83; 528/84; 528/85
[58] Field of Search ..................................... 521/155, 157, 521/170, 175, 176; 528/66, 75, 80, 83, 84, 85

[56] References Cited

U.S. PATENT DOCUMENTS

| | | | |
|---|---|---|---|
| 3,869,421 | 3/1975 | Sapp et al. | 260/33.6 AQ |
| 4,234,714 | 11/1980 | Earing et al. | 528/67 |
| 4,752,626 | 6/1988 | Hoye et al. | 521/175 |
| 4,906,673 | 3/1990 | Mori et al. | 521/131 |
| 5,242,977 | 9/1993 | Franke et al. | 525/90 |
| 5,332,786 | 7/1994 | Nagata et al. | 525/130 |

FOREIGN PATENT DOCUMENTS

| | | | |
|---|---|---|---|
| 295640 | 12/1988 | European Pat. Off. . | |
| 610714 | 8/1994 | European Pat. Off. . | |
| 639596 | 2/1995 | European Pat. Off. . | |
| 0732349 A2 | 2/1996 | European Pat. Off. | C08G 19/40 |
| 3943080 | 7/1991 | Germany . | |
| WO 97/00902 | 6/1996 | WIPO | C08G 18/62 |

OTHER PUBLICATIONS

International Search Report dated Jun. 3, 1998.

*Primary Examiner*—Duc Truong
*Attorney, Agent, or Firm*—Donald F. Haas

[57] ABSTRACT

The present invention relates to a mixture of polyols for use in the preparation of polyurethane foam comprising:

(i) 80–99% by weight of at least one polyether polyol and/or at least one polyester polyol; and
(ii) 1–20% by weight of at least one polyolefin polyol.

The invention further relates to a process for preparing polyurethane foams, using the said mixture of polyols; to polyurethane foams obtainable by such process; and to articles and composites containing the said polyurethane foams.

19 Claims, No Drawings ions are required to be able to manufacture the different foams. Yet, it remains difficult to meet all the desired properties and compromises may have to be made.

USE OF POLYOL MIXTURES IN RIGID AND SEMI-RIGID POLYURETHANE FOAMS

FIELD OF THE INVENTION

This invention relates to rigid and semi-rigid polyurethane foams containing a mixture polyols, especially polyurethane foams having a strong adhesion to polyolefins and block copolymers comprising more than 50% by weight of at least one polyolefin block.

BACKGROUND OF THE INVENTION polyurethane foams are typically produced from a polyol and a polyisocyanate. Polyurethane foams are well known in the art and have numerous applications. Rigid and semi-rigid foams are used in a wide variety of applications, in turn requiring an extensive range of foam properties. A significant number of different polyol grades are required to be able to manufacture the different foams. Yet, it remains difficult to meet all the desired properties and compromises may have to be made.

A variety of polyols have been proposed for use in the manufacture of polyurethane foams, including polyether polyols such as those marketed under the tradename CARADOL and TERATHANE and POLYTHF and polyester polyols such as those marketed under the tradename TONE and FORMREZ.

International PCT publication No. WO 97/00902 discloses the preparation of polyurethane foams, in particular resilient, flexible foams, from an aromatic polyisocyanate having a functionality of from 2.5 to 3.0 isocyanate groups per molecule and a polydiene diol having a number average molecular weight from 1,000 to 20,000 and a functionality of from 1.6 to 2 hydroxyl groups per molecule.

It is known to use mixtures of polyols to prepare polyurethane foams having desired properties. Examples of polyol mixtures for use in the preparation of rigid and semi-rigid polyurethane foams include those marketed under the tradenames CARADOL PP520-03, LP585-01, LP530-03, GB450-01, GB475-01, GB250 and the like.

U.S. Pat. No. 4,752,626 describes the preparation of a high resilience urethane foam. The foaming system is composed of a thixotropic polyisocyanate component and a thixotropic polyol component. The polyol component comprises a polyol blend of a polyolefinic polyol and a polyoxyalkylene polyol in a weight ratio between 95/5 to 50/50.

It will be appreciated that there is still room for improvement in this field. In particular, there is a need for improving adhesion of rigid and semi-rigid polyurethane foams to polyolefins, including copolymers of olefin monomers, and block copolymers comprising more than 50% by weight of at least one polyolefin block, without, however, a significant impact on other desirable properties of the foam.

Thus far, it has been difficult to adhere polyurethane foams strongly to polyolefins without the use of a separate adhesive layer. In particular, polyurethane foams are known not to adhere strongly to thermoplastic polyolefins without the use of a separate adhesive layer.

Surprisingly, rigid and semi-rigid polyurethane foams have now been found having one or more advantageous properties as compared to prior art foams of this type. In particular, foams have been found which are capable of adhering very strongly to polyolefins and block copolymers comprising more than 50% by weight of at least one polyolefin block, by using a specific polyol mixture.

SUMMARY OF THE INVENTION

Therefore, according to a first aspect, the present invention relates to a mixture of polyols for use in the preparation of polyurethane foam comprising:

(i) 80–99% by weight of at least one polyester or polyether polyol; and (ii) 1–20% by weight of at least one polyolefin polyol.

Preferably, the polyolefin polyol is present in an amount of from 2 to 20% by weight, more preferably 2 to 5%. The polyolefin polyol can be linear or radial, preferably linear. The polyolefin polyol typically has a functionality in the range from 0.8 to 8, preferably, from 0.8 to 3.

The functionality of the polyester polyol and/or polyether polyol is typically in the range from 0.8 to 8, but preferably in the range from more than 2 to 8, more preferably in the range from more than 2 to 5. To ensure sufficient cross-linking in the foam to be produced, it is preferred that the weight average functionality of the polyol mixture is more than 2, preferably in the range from 2.5 to 8, more preferably in the range from 2.5 to 5. The functionality is defined as the number of functional groups, in this case hydroxy groups, per molecule. The functionality can be determined by NMR or chemical titration techniques.

The weight average functionality of the mixture is determined by the following formula (I).

$$[F_{po}*\%wt_{po}+F_{es}*\%wt_{es}+F_{et}*\%wt_{et}]/100 \qquad (I)$$

In this formula F stands for functionality of the polyols, po stands for polyolefin polyol, es stands for polyester polyol, et stands for polyether polyol, and % wt stands for the weight percentage of the respective polyols in the mixture.

DETAILED DESCRIPTION OF THE INVENTION

The polymer backbone of the polyolefin polyol, that is the polyolefin, is typically the polymerised product of an olefin monomer or an olefin monomer and a vinylaromatic monomer. The olefin monomer typically contains from 2 to 12 carbon atoms. Preferably, the olefin monomer is a diene containing from 4 to 10 carbon atoms, more preferably from 4 to 6 carbon atoms, even more preferably butadiene or isoprene, most preferably butadiene.

The vinylaromatic monomer is preferably a vinyl-monoaromatic monomer, such as styrene or alkyl-substituted styrene, wherein the alkyl-substituent(s) contain from 1 to 4 carbon atoms. More preferably, the vinylaromatic monomer is styrene or mono-alkyl-substituted styrene. The polyolefin polyol may contain up to 50% by weight of polymerised vinylaromatic monomer, preferably from 0 to 20% by weight, more preferably from 0 to 5% by weight.

Preferably, the polyolefin polyol contains less than 20% olefinic unsaturation in the polymer backbone. More preferably, the olefinic unsaturation is less than 5%. Olefinic unsaturation as used herein is intended to exclude unsaturation present in any aromatic groups in the polymer. Ways to determine olefinic unsaturation are known to those skilled in the art.

The polyolefin polyol is preferably a polydiene polyol, more preferably a polydiene diol or a polydiene mono-ol or mixtures thereof. Most preferably, the polyolefin polyol is a polydiene diol. Typically, the polydiene diol has a functionality in the range from 1.5 to 2.5 hydroxyl groups per molecule, preferably in the range from 1.8 to 2.0, more preferably in the range from 1.9 to 2.0. The functionality of the polydiene mono-ol is typically in the range between 0.8 and 1.5, preferably from 0.85 to 1.15, more preferably from 0.9 to 1.0.

The polymer backbone of the polydiene diol and mono-ol, that is the polydiene, is typically the hydrogenated polymerised product of conjugated diene monomers containing from 4 to 10 carbon atoms; preferably, from 4 to 6 carbon atoms; more preferably butadiene or isoprene, in particular butadiene. Preferably, hydrogenated polybutadiene diol is used having a 1,2-addition between 30% and 70% to minimise viscosity and subsequent crystallisation. The polydiene diol and/or mono-ol preferably used in this invention may be prepared anionically such as described in U.S. Pat. Nos. 5,376,745, 5,391,663, 5,393,843, 5,405,911, and 5,416,168, which are herein incorporated by reference.

Polymerisation of the polydiene diol commences with a monolithium or dilithium initiator which builds a living polymer backbone at each lithium site. The anionic polymerisation is carried out in solution in an organic solvent, typically a hydrocarbon like hexane, cyclohexane or benzene, although polar solvents such as tetrahydrofuran can also be used. The molar ratio of initiator to monomer determines the molecular weight of the polymer.

If the conjugated diene is 1,3-butadiene and the resulting polymer is to be hydrogenated, the anionic polymerisation of butadiene in a hydrocarbon solvent like cyclohexane is typically controlled with structure modifiers such as diethylether or glyme (1,2-diethoxy-ethane) to obtain the desired amount of 1,2-addition. The optimum balance between low viscosity and high solubility in a hydrogenated polybutadiene polymer occurs at a 60/40 ratio of 1,4-butadiene/1,2-butadiene. This butadiene microstructure may, e.g., be achieved during polymerisation at 50° C. in cyclohexane containing about 6% by volume of diethylether or about 1000 ppm of glyme.

Anionic polymerisation is terminated by addition of a functionalizing agent like those in U.S. Pat. Nos. 5,391,637, 5,393,843, and 5,418,296, but preferably the living polymer is capped with ethylene oxide, prior to termination. Thus, if a di-lithium initiator is used, each mole of living polymer is preferably capped with two moles of ethylene oxide and terminated with two moles of methanol to yield the desired polydiene diol.

The polydiene diol can also be made using a monolithium initiator which contains a hydroxyl group which has been blocked as the silyl ether (as in U.S. Pat. Nos. 5,376, 745 and 5,416,168). A suitable initiator is hydroxypropyl-lithium in which the hydroxyl group is blocked as the trimethylsilyl ether. This mono-lithium initiator can be used to polymerise butadiene in hydrocarbon or polar solvent. Each mole of living polymer is then capped with one mole of ethylene oxide and terminated with one mole of methanol to yield the mono-hydroxy polydiene polymer. The silyl ether is then removed by acid catalysed cleavage in the presence of water yielding the desired polydiene diol.

The polydiene mono-ol may be prepared in a way analogous to the preparation process of the polydiene diol. In the preparation of polydiene mono-ol a mono-lithium initiator is typically used, not containing any hydroxy groups as discussed above. The conjugated diene monomer is polymerised with the initiator to yield a living polymer. Preferably, each mole of living polymer is then capped with one mole of ethylene oxide and terminated with one mole of methanol.

The polydiene diol and/or mono-ol is preferably hydrogenated such that at least 90%, more preferably at least 95%, of the olefinic carbon to carbon double bonds in the diol is saturated. Hydrogenation of these polymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755. A particularly preferred catalyst is a mixture of nickel 2-ethylhexanoate and triethylaluminum.

The po-Lybutadiene polymer preferably has no less than about 30% 1,2-butadiene addition because, after hydrogenation, the polymer will be a waxy solid at room temperature if it contains less than about 30% 1,2-butadiene addition. To minimise the viscosity of the diol and/or mono-ol, the 1,2-butadiene content is preferably between 40 and 60%.

If isoprene is used as the conjugated diene for the preparation of the polydiene diol, the isoprene polymers preferably have no less than 80% 1,4-isoprene addition in order to reduce Tg and viscosity. The diene microstructures are typically determined by $^{13}C$ nuclear magnetic resonance (NMR) in chloroform.

The polydiene mono-ols preferably have hydroxyl equivalent weights in the range of from 500 to 15,000, more preferably in the range of from 1,000 to 12,500. The polydiene diols preferably have hydroxyl equivalent weights in the range of from 250 to 10,000, more preferably in the range of from 500 to 7,500, most preferably between 1,500 and 3,000.

For the polydiene diols suitable number average molecular weights will be between 500 and 20,000, more preferably between 1,000 and 15,000, most preferably between 3,000 and 6,000. For the polydiene mono-ols suitable number average molecular weights will be between 500 and 15,000, more preferably between 1,000 and 12,500, most preferably between 1,500 and 6,000. The number average molecular weights referred to here are number average molecular weights measured by gel permeation chromatography (GPC) calibrated with polybutadiene standards having known number average molecular weights. The solvent for the GPC analyses is tetrahydrofuran.

Polyether polyols and polyester polyols are well known to those skilled in the art, and available commercially. Of the group of polyester polyols and polyether polyols, preferably a polyether polyol is used.

The polyether polyols are typically the reaction product of an alkylene oxide and an initiator. As alkylene oxide, preferably propylene oxide or mixtures of propylene oxide and ethylene oxide are used.

Initiators are also well known to those skilled in the art. Examples of suitable initiators for making polyether polyol used in the preparation of rigid and semi-rigid foams include glycerol, sucrose, sorbitol, amines, glycols, or phenolic compounds as well as mixtures thereof.

The structure of the polyether polyol chains is very important as it determines the properties of the final polyurethane foam. The polyether polyol's molecular weight and functionality are the most important factors. It belongs to the skill of the skilled person in this field to select the appropriate polyether polyol for a desired range of properties.

The polyether polyols preferably have a number average molecular weight in the range of from 200 to 2000, preferably from 250 to 1500, more preferably from 250 to 1000. The polyether polyols are often characterised by their hydroxyl value. For the preparation of rigid foams, the hydroxyl value preferably ranges from 200 to 1500 mg KOH/g, more preferably from 250 to 1000 mg KOH/g, as determined by ASTM D2849A. If semi-rigid foams are to be prepared, the hydroxyl value preferably ranges from 100 to 400 mg KOH/g. If mixtures of polyether polyols are used, it will be appreciated that the hydroxyl values of the individual polyether polyols may suitably lie outside the above ranges, but, preferably, the average hydroxyl value of the polyether polyol mixture is kept within the ranges given above.

According to a further aspect, the present invention relates to a process for preparing polyurethane foams comprising the steps of:

combining 1 to 20 parts of at least one polyolefin polyol and 80 to 99 parts of at least one polyester polyol and/or polyether polyol, the total of polyolefin polyol and polyester polyol and/or polyether polyol being 100, with a blowing agent, a catalyst and optionally a surfactant to form a blend;

adding a polyisocyanate having a functionality of more than two isocyanate groups per molecule, in such an amount that the NCO:OH molar ratio is at least 0.9:1; and foaming the combined blend and polyisocyanate to form a polyurethane foam.

Preferably, the NCO:OH molar ratio is between 0.9:1 and 1.3:1. If water is used as a blowing agent, more preferably the NCO:OH molar ratio is more than 1:1. For the purposes of this specification, it is to be understood that in determining the NCO:OH molar ratio, only OH groups from the polyol mixture are taken into account.

In principle any polyisocyanate, and mixtures of polyisocyanates, can be used for the preparation of rigid and semi-rigid polyurethane foams. However, the polyisocyanate and/or the mixture of polyols must have a functionality above 2 to enable cross-linking to form a three-dimensional network. Preferably, both the mixture of polyols and the polyisocyanate(s) have an average functionality above 2. The functionality of the polyisocyanate is preferably between 2 and 8, more preferably between 2 and 5.

Preferably, the polyisocyanate is an aromatic polyisocyanate, most preferably polymeric diphenylmethane diisocyanate (MDI). Polymeric MDI, sometimes referred to as crude MDI, is commercially available. A polymeric MDI grade is marketed by Shell under the tradename CARADATE 30.

Surfactants are often added to improve the miscibility of the components, which in turn promotes the hydroxyl/isocyanate reaction. Further, the surface tension of the mixture is reduced, which influences the cell nucleation and stabilises the expanding foam, leading to a fine cell structure. Preferably, the surfactant is a silicone oil. An example of a suitable commercially available silicone oil is TEGOSTAB-B8404 (TEGOSTAB is a trademark). The surfactant, if present, is normally added in an amount of from 0.5 to 5 parts by weight (pbw) of the total polyol mixture, preferably from 0.5 to 2 pbw of the total polyol mixture.

In principle any catalyst known to catalyse one or more of the foaming reactions in the system may be used. Examples of suitable catalysts are described in European patent specification No. 0 358 282 and include amines such as tertiary amines, salts of carboxylic acids, and organometallic catalysts.

Examples of suitable tertiary amines are triethylene diamine, N-methylmorpholine, N-ethylmorpholine, diethylethanol-amine, N-cocomorpholine, 1-methyl-4-dimethylaminoethylpiperazine, 3-methoxypropyldimethylamine, N,N,N'-trimethylisopropyl propylenediamine, 3-diethylamino propyldiethylamine, dimethylbenzylamine and dimethylcyclohexylamine. An example of a carboxylic acid salt useful as a catalyst is sodium acetate. Suitable organometallic catalysts include stannous octoate, stannous oleate, stannous acetate, stannous laureate, lead octoate, lead naphthenate, nickel naphthenate, cobalt naphthenate and dibutyltin dichloride. Further examples of organometallic compounds useful as catalyst in the production of polyurethanes are described in U.S. Pat. No. 2,846,408 which is herein incorporated by reference. Of course, mixtures of two or more of the above catalysts may also be applied.

The amount in which the catalyst, or the mixture of catalysts, is used normally lies in the range of from 0.01 to 5.0 pbw, preferably in the range of from 0.2 to 2.0 pbw, per 100 parts of polyol mixture.

A variety of blowing agents may be used. Suitable blowing agents include halogenated hydrocarbons, aliphatic alkanes, and alicyclic alkanes, as well as water which is often referred to as a chemical blowing agent. Due to the ozone depleting effect of the fully chlorinated, fluorinated alkanes (CFC's), the use of this type of blowing agent is not preferred, although it is possible to use them within the scope of the present invention. The halogenated alkanes, wherein at least one hydrogen atom has not been substituted by a halogen atom (the so called HCFC's) have a lower ozone depleting potential and therefore are the preferred halogenated hydrocarbons to be used in physically blown foams. A very suitable HCFC type blowing agent is 1-chloro-1,1-difluoroethane.

The use of water as a (chemical) blowing agent is also well known. Water reacts with isocyanate groups according to the well known $NCO/H_2O$ reaction, thereby releasing carbon dioxide which causes the blowing to occur.

The aliphatic and alicyclic alkanes, finally, were developed as alternative blowing agents for the CFC's. Examples of such alkanes are n-pentane, isopentane, and n-hexane (aliphatic), and cyclopentane and cyclohexane (alicyclic).

It will be understood that the above blowing agents may be used singly or in mixtures of two or more. Of the blowing agents mentioned, water and cyclopentane have been found to be particularly suitable as blowing agent for the purpose of the present invention. The amounts wherein the blowing agents are to be used are those conventionally applied, i.e. in the range of from 0.1 to 5 pbw per 100 parts of polyol mixture in case of water and in the range of from about 0.1 to 20 pbw per 100 parts of polyol reactant in case of halogenated hydrocarbons, aliphatic alkanes, and alicyclic alkanes. Preferably, the blowing agent is water.

Water is preferably added in an amount of from 0.5 to 3.5 parts by weight (pbw) per 100 parts of polyol mixture. Preferably, distilled or de-mineralised water is used, as impurities may affect the foam reaction.

A variety of amines, organometallic catalysts, and silicone surfactants for making polyurethane foams are commercially available from Air Products under the tradename DABCO.

If desired, flame retardants, fillers, and other additives may be added. It belongs to the skill of the average skilled person in this field to select appropriate additional compounds to be added to the composition to be foamed.

The polyurethane foams are preferably prepared by blending all of the components except the polyisocyanate. The polyol mixture is preferably preheated to reduce viscosity prior to blending. After blending, the polyisocyanate is quickly added and briefly stirred before pouring the mixture into a mould to hold the expanding foam. The mould typically contains a polyolefinic substrate to which the foam must adhere.

The polyurethane foam may be subjected to a curing treatment by heating the foam to an elevated temperature, usually between 100° and 160° C. for a certain period of time, typically in the range from 10 minutes to 96 hours, preferably from 30 minutes to 48 hours. Usually, however, the heat generated by the exothermic polyurethane forming reaction is sufficient to ensure complete curing, and the process is carried out adiabatically.

According to a third aspect, the present invention relates to a polyurethane foam obtainable by a process as described herein before. The foam according to the present invention typically has an overall density in the range of from 10 to 800 kg/m$^3$, preferably from 20 to 250 kg/m$^3$, more preferably from 20 to 120 kg/m$^3$.

The adhesion of the foam according to the invention to polypropylene is typically more than 150 N/25 cm$^2$, as determined by the force required to unstick a flat polypropylene plate of 25 cm$^2$ from the foam. Preferably, the adhesion to polypropylene is more than 200 N/25 cm$^2$, more preferably from 250 to cohesion failure of the foam itself.

The invention further relates to articles containing such polyurethane foam, as well as to composites of a polyolefin or block copolymers comprising more than 50% by weight of at least one polyolefin block, and such polyurethane foam.

The foams of the present invention are preferably used as insulating material (including noise insulating material) in household equipment, pipe insulation, automotive applications, e.g. in dashboards, and in the building industry.

The following examples show rigid and semi-rigid polyurethane foams in accordance with the present invention. The examples are not intended to limit the present invention to specific embodiments although each example may support a separate claim which is asserted to be a patentable invention.

EXAMPLE 1

A polyol mixture was prepared for use in the preparation of a semi-rigid polyurethane foam. The polyol mixture contained 50 parts by weight (pbw) of a polyetherpolyol having a hydroxyl value of 520 mg KOH/g and marketed under the tradename CARADOL 520-03, 45 pbw of a polyetherpolyol having a hydroxyl value of 36 mg KOH/g and marketed under the tradename CARADOL 36-03, and 5 pbw of a hydrogenated polybutadiene diol having a functionality of 1.9 and a hydroxyl equivalent weight of 1700.

To the polyol mixture was added 1 part by weight per 100 parts polyol mixture (pbw) of a silicone oil surfactant, marketed under the tradename TEGOSTAB B8404; 0.8 pbw of a glyme-type catalyst, marketed under the tradename DIME-6; and 0.8 pbw of an amine-type catalyst, marketed under the tradename DABCO 33LV. The latter catalyst is a blend of 33% by weight triethylenediamine (TEDA) and 67% by weight dipropylene glycol.

Subsequently, 105 pbw per 100 parts of polyol mixture of polymeric MDI was added. The polymeric MDI, marketed under the tradename CARADATE 30, contained about 70% by weight of diphenylmethane diisocyanate, the remainder being isomers, oligomers, and polymers thereof. The NCO:OH molar ratio amounted to 1.05:1.

In addition, 1.8 pbw of water per 100 parts of the total polyol mixture was added as the (chemical) blowing agent.

The blend was poured into a mould at the bottom of which a polyolefin plate had been placed. The mould was closed and the blend was allowed to react without additional heating or cooling of the mould. After the reaction was complete and a foam had been produced, the mould containing the foam was allowed to cool for 60 minutes.

The same experiment was repeated a number of times, each time using a different type of polyolefin material in the mould. The force necessary to unstick the polyolefin plate from the foam was determined. The results are reported in Table 1.

EXAMPLE 2

The experiment as described in Example 1 was repeated a number of times, each time using a different type of polyolefin material in the mould. The polyol mixture used was different from the mixture used in Example 1 in that it contained 15 pbw of the polybutadiene diol used in Example 1 and 35 pbw of CARADOL 36-03. The force necessary to unstick the polyolefin plate from the foam was determined. the results are reported in Table 1.

COMPARATIVE EXAMPLE 3

The experiment as described in Example 1 was repeated a number of times, each time using a different type of polyolefin material in the mould. The polyol mixture used was different from the mixture used in Example 1 in that it contained only polyether polyol, that is no polybutadiene diol, but instead 50 pbw of CARADOL 36-03. The force necessary to unstick the polyolefin plate from the foam was determined. The results are reported in Table 1.

TABLE 1

| | Force required to unstick polyolefin plates from polyurethane foams. | | |
|---|---|---|---|
| Polyolefin plates | Example 1 (N/25 cm$^2$) | Example 2 (N/25 cm$^2$) | Comp. Ex. 3 (N/25 cm$^2$) |
| MM 17 | >600 (c) | >600 (c) | 83 |
| GXPA 018 | 420 (c) | >600 (c) | 91 |
| GXPA 055 | >600 (c)/445 | >600 (c) | 81/78 |
| GXPA 064 | 450 | >600 (c) | 81 |

(c) = cohesive failure of the foam.
81/78 = tested twice

As can be seen from Table 1, the addition of a small amount of polydiene diol to polyether polyol dramatically improves the adhesion of polyurethane foam produced from the polyols to polyolefinic substrates. The polyolefinic substrates used in the tests reported in Table 1 were obtained from Montell Polyolefins. MM17 is a polypropylene resin. GXPA018 is a glass-fibre reinforced polypropylene, containing 30% by weight of glass fibres. GXPA055 is a glass-fibre reinforced, impact modified polypropylene, containing 35% by weight of glass fibre. GXPA064 is an impact-modified polypropylene containing 30% by weight of CaCO$_3$. GXPA grades are marketed by Montell Polyolefins under the tradename HIVALLOY.

EXAMPLE 4

Introducing the hydrogenated polybutadiene diol of Example 1 in rigid foam enhances the adhesion of the foam to the polyethylene. Moreover, the optimal level in the formulation is 3%. This level gives in most cases a foam cohesion failure rather than a foam/PE adhesion failure. For higher amounts this phenomenon is not seen. The foam looks good and cannot be distinguished from the reference formulation. Furthermore, other typical foam properties (mechanical and thermal properties, closed cell content) were measured and compared to the reference formulation. Foam quality stays good.

The samples were prepared as follows:
mould and polyethylene plates were preheated at approximately 50° C.
plates were glued in the mould
reaction mixtures was poured onto the plates, mould was closed filling density of the mould was approximately 50 g/l mouldings were cut and tested few days afterwards The reference formulation is based on CARADOL GB475-01 and GB250-01 which are polyetherpolyols having hydroxyl values of 475 and 250, respectively. Modified formulations contain 3%, 5%, or 10% (of polyol blend) of the polybutadiene diol (PB diol). The results are shown in Tables 2 and 3.

TABLE 2

|  | Ref. | 3% | 5% | 10% |
|---|---|---|---|---|
| PRODUCT |  |  |  |  |
| GB250-01 | 60 | 57 | 55 | 50 |
| GB470-01 | 40 | 40 | 40 | 40 |
| PB Diol | 0 | 3 | 5 | 10 |
| TEGOSTAB B-8404 | 1.5 | 1.5 | 1.5 | 1.5 |
| Dime-6 | 1.1 | 1.1 | 1.1 | 1.1 |
| $H_2O$ | 4 | 4 | 4 | 4 |
| CARADATE-30 | 146 | 144.3 | 143.3 | 141 |
| PROPERTIES |  |  |  |  |
| Core Density | 45.1 g/l | 44.6 | 42.6 | 43.6 |
| Compressive Strength | 250 kPa | 229 | 187 | 212 |
| Adhesion | 80 kPa | 223 | 144 | 161 |
| CCC | 91% | 91 | 90 | 89 |
| Tsoftening | 135° C. | 137 | 136 | 137 |

*ccc = closed cell content

Concerning the thermal conductivity aging behavior of the foam, Lambda, the reference formulation was compared with the 5% formulation. The foams were conditioned at 50° C. and the thermal conductivity was measured at several intervals. The polybutadiene diol apparently ages slightly faster, but this is nothing to worry about as the difference is small as the foam is well protected by the polyethylene which is a good diffusion barrier anyway.

TABLE 3

| Lambda Ref (mW/mK) | Lambda 5% formulation | Time (days) |
|---|---|---|
| 23.8 | 23.6 | 0 |
| 25.7 | 26.2 | 3 |
| 26.8 | 27.5 | 4 |
| 30.4 | 31.7 | 9 |
| 32.9 | 33 | 16 |

The use of 3% of polybutadiene diol in the formulation significantly improves the adhesion of the foam to the polyethylene without affecting other foam properties significantly.

We claim:

1. A mixture of polyols for use in the preparation of polyurethane foam comprising:
   (i) 80–99% by weight of at least one polyether polyol and/or at least one polyester polyol; and
   (ii) 1–20% by weight of at least one polyolefin polyol.

2. A mixture as claimed in claim 1, wherein the polyolefin polyol is present in an amount of from 2 to 20% by weight.

3. A mixture as claimed in claim 2, wherein the polyolefin polyol is present in an amount of from 2 to 5% by weight.

4. A mixture as claimed in claim 1, wherein the polyolefin polyol has a functionality in the range from 0.8 to 8.

5. A mixture as claimed in claim 4, wherein the polyolefin polyol has a functionality in the range from 0.8 to 3.

6. A mixture as claimed in claim 1, wherein the polyolefin polyol is a polydiene polyol.

7. A mixture as claimed in claim 6, wherein the polydiene polyol is a polydiene diol or mono-ol or a mixture thereof.

8. A mixture as claimed in claim 7, wherein the polydiene diol has a functionality in the range of from 1.5 to 2.5 hydroxyl groups per molecule.

9. A mixture as claimed in claim 7, wherein the polydiene mono-ol has a functionality between 0.8 and 1.5 hydroxyl groups per molecule.

10. A process for preparing polyurethane foams comprising the steps of:

combining 1 to 20 parts of at least one polyolefin polyol and 80 to 99 parts of at least one polyester polyol and/or polyether polyol, the total of polyolefin polyol, polyester polyol and polyether polyol being 100, with a blowing agent, a catalyst, and optionally a surfactant, to form a blend;

adding a polyisocyanate having a functionality of more than two isocyanate groups per molecule in such an amount that the NCO:OH molar ratio is at least 0.9:1; and foaming the combined blend and polyisocyanate to form a polyurethane foam.

11. A process as claimed in claim 10, wherein the NCO:OH molar ratio is between 0.9:1 and 1.3:1.

12. A process as claimed in claim 10, wherein water is the blowing agent.

13. Polyurethane foam produced by the process of claim 10.

14. The polyurethane foam of claim 13 wherein the density is from 10 to 800 kg/m$^3$.

15. The polyurethane foam of claim 13 wherein the density is from 20 to 250 kg/m$^3$.

16. The polyurethane foam of claim 13 wherein the density is from 20 to 120 kg/m$^3$.

17. An article containing the polyurethane foam of claim 13.

18. A composite of a polyolefin and the polyurethane foam of claim 13.

19. A polyurethane foam comprising the mixture of claim 1, a polyisocyanate having a functionality of more than two isocyanate groups per molecule in such an amount that the NCO:OH molar ratio is at least 0.9:1, and a blowing agent.

* * * * *